UNITED STATES PATENT OFFICE.

JAMES H. KELLEY, OF NEW YORK, N. Y.

ROOF-COATING.

SPECIFICATION forming part of Letters Patent No. 289,003, dated November 27, 1883.

Application filed July 21, 1883. (Specimens.)

*To all whom it may concern:*

Be it known that I, JAMES H. KELLEY, a citizen of the United States, residing at New York city, in the county of New York and State of New York, have invented and discovered a new and useful composition of matter to be used for preserving and protecting shingle roofs, bridges, and all kinds of exposed wood, also for preserving tin and iron roofs, of which the following is a specification.

My composition consists of the following ingredients, combined in the proportions stated, viz: coal-tar, twenty-five gallons; oil-creosote, ten gallons; rosin-oil, five gallons; pulverized slate, forty pounds; oxide of iron, twenty-five pounds; air-slaked lime, twelve pounds; other cement, or Rosendale cement, ten pounds; fine salt, one pound; fine-sifted wood-ashes, one peck.

In using the above-named composition the ingredients are thoroughly mixed while heating the same to 397° Fahrenheit. The roof is carefully looked over and repaired in bad places. Then the holes and crevices of the roof are filled up with a paste made of equal proportions of the pulverized slate and oxide of iron, with or in combination with a sufficient quantity of the "roof-coating" to suit the purpose. The roof-coating is then administered by means of brushes or any suitable method, thoroughly coating the whole surface of the roof, the coating being put on at the heat above stated. The object of heating the composition is not only to thoroughly mix the component parts, but more especially to give to the composition the quality of penetration, the said mixture entering into the pores of the wood and communicating to the same the characteristics of the composition when solidified.

In manufacturing the composition the salt may be omitted without interfering with my invention, and the rosin substituted for the rosin-oil without affecting the same.

The nature and object of my invention is to provide a composition which is a very powerful antiseptic, and also one which gives a fire-proof surface. The first three component parts of the composition contain the penetrating qualities, and also preservative powers. The latter part of the formula is used for a body and surface coating, and also possesses the qualities which are wholly fire-proof, so that a person using my coating on roofs will protect the same and contents from moisture, and make the same a shield against sparks and cinders.

What I claim as my discovery, and for which I desire to obtain Letters Patent of the United States, is—

The herein-described composition of matter to be used for protecting and preserving roofs and all kinds of exposed surfaces, consisting of coal-tar, oil-creosote, rosin or rosin-oil, pulverized slate, oxide of iron, air-slaked lime, cement, fine salt, and fine-sifted wood-ashes, in the proportions specified.

Signed at Utica, in the county of Oneida and State of New York.

JAMES H. KELLEY.

Witnesses:
RICHARD EVANS,
WILLIAM P. QUIN.